United States Patent
Cosgrove et al.

(10) Patent No.: US 12,447,459 B1
(45) Date of Patent: *Oct. 21, 2025

(54) POLYMER-MONOLITH PRE-OXIDATION TO IMPROVE SHAPE RETENTION DURING SUBSEQUENT HEAT TREATMENT, AND MONOLITH PRODUCED

(71) Applicant: ADVANCED FUEL RESEARCH, INC., East Hartford, CT (US)

(72) Inventors: Joseph E. Cosgrove, Columbia, CT (US); Michael A. Serio, Sturbridge, MA (US); Marek A. Wójtowicz, Manchester, CT (US); Andrew E. Carlson, Higganum, CT (US)

(73) Assignee: ADVANCED FUEL RESEARCH, INC.

( * ) Notice: Subject to any disclaimer, the term of this patent is extended or adjusted under 35 U.S.C. 154(b) by 641 days.

This patent is subject to a terminal disclaimer.

(21) Appl. No.: 17/858,638

(22) Filed: Jul. 6, 2022

Related U.S. Application Data

(60) Provisional application No. 63/220,263, filed on Jul. 9, 2021.

(51) Int. Cl.
| | | |
|---|---|---|
| *B01J 20/20* | (2006.01) | |
| *B01J 20/28* | (2006.01) | |
| *B01J 20/30* | (2006.01) | |
| B33Y 70/00 | (2020.01) | |
| B33Y 80/00 | (2015.01) | |

(52) U.S. Cl.
CPC ......... *B01J 20/20* (2013.01); *B01J 20/28045* (2013.01); *B01J 20/3078* (2013.01); *B01J 2220/4812* (2013.01); *B33Y 70/00* (2014.12); *B33Y 80/00* (2014.12)

(58) Field of Classification Search
CPC ....................................................... B01J 20/20
See application file for complete search history.

(56) References Cited

U.S. PATENT DOCUMENTS

| | | | | |
|---|---|---|---|---|
| 4,399,052 A | * | 8/1983 | Sugino | C01B 32/382 |
| | | | | 428/116 |
| 6,228,803 B1 | * | 5/2001 | Gadkaree | B01J 21/18 |
| | | | | 428/402 |
| 8,231,712 B2 | | 7/2012 | Wójtowicz et al. | |
| 8,615,812 B2 | | 12/2013 | Wójtowicz et al. | |
| 9,073,039 B2 | | 7/2015 | Wójtowicz et al. | |
| 12,083,495 B2 | * | 9/2024 | Cosgrove | B01J 20/3007 |
| 2021/0001305 A1 | | 1/2021 | Cosgrove et al. | |

OTHER PUBLICATIONS

Paul & Jennings, "Results of the trace contaminant control trade study for space suit life support development," SAE 2009-01-2370, 39th ICES conf., Savannah, GA, USA, 2009.

Wójtowicz et al., "Pressure-swing adsorption of trace contaminants using carbon sorbent monoliths," ICES-2021-358, 50th ICES Conf., Jul. 12-15, 2021.

Wójtowicz et al., "Monolithic trace-contaminant sorbents fabricated from 3D-printed polymer precursors," ICES-2019-286, 49th ICES conf., Boston, MA, USA, 2019.

Paul et al., "Requirements and sizing investigation for Constellation space suit Portable Life Support System trace contaminant control," AIAA 2010-6065, 40th ICES Conf., 2010.

Wójtowicz et al., "Reversible Ammonia Sorption on Carbon for the Primary Life Support System (PLSS)," AIAA 2012-3437, 42nd ICES conf., San Diego, CA, USA, 2012.

Wójtowicz et al., "Adsorption of Ammonia on Regenerable Carbon Sorbents," ICES-2015-179, 42nd ICES conf., Bellevue, WA, USA, 2015.

Cybulski & Moulijn, "Monoliths in Heterogeneous Catalysis," Catal. Rev.-Sci. Eng. 36(2), 179-270, 1994, Taylor & Francis, UK.

* cited by examiner

*Primary Examiner* — Stuart L Hendrickson
(74) *Attorney, Agent, or Firm* — Irving M. Fishman

(57) ABSTRACT

High purity carbon sorbent monoliths, particularly effective for the removal of trace-contaminants such as ammonia, formaldehyde, and methyl mercaptan from a gas flow, are fabricated by 3D-printing polymer monoliths, pre-oxidizing them in a flow of air at a temperature below the melting point of the polymer precursor, carbonizing them, and subsequently activating them to a weight loss of about 20 percent. The pre-oxidation step effectively prevents polymer-monolith swelling and melting during carbonization.

15 Claims, 2 Drawing Sheets

POLYMER-MONOLITH PRE-OXIDATION TO IMPROVE SHAPE RETENTION DURING SUBSEQUENT HEAT TREATMENT, AND MONOLITH PRODUCED

CROSS-REFERENCE TO RELATED APPLICATION

This application claims the benefit of U.S. provisional application No. 63/220,263, filed on Jul. 9, 2021 and entitled POLYMER MONOLITH PRE-OXIDATION TO IMPROVE SHAPE RETENTION IN THE FABRICATION OF MONOLITHIC TRACE-CONTAMINANT SORBENTS FABRICATED FROM 3D-PRINTED POLYMER PRECURSORS, the entire specification of which is incorporated hereinto by reference thereto.

STATEMENT REGARDING FEDERALLY SPONSORED RESEARCH OR DEVELOPMENT

The United States Government has rights in this invention under the following contract: National Aeronautics and Space Administration contract No. 80NSSC19C0124.

BACKGROUND OF THE INVENTION

The development of regenerable life support systems is critically important for the advancement of NASA's space-exploration projects. In addition to carbon dioxide ($CO_2$) and water vapor ($H_2O$) control, trace-contaminant (TC) removal plays a key role in life support systems, ensuring high quality air for the crew during Extravehicular Activities (EVAs) and also on board spacecraft. This invention addresses, in particular, the fabrication of structured (monolithic), carbon-based TC sorbents for space suits used in EVAs.

The existing approach to sorbent fabrication typically involves the following steps: (1) preparation of the precursor material (polymer) in a desired shape using 3D printing or any other suitable fabrication method; (2) precursor carbonization (pyrolysis) to produce a carbon monolith; and (3) monolith activation to obtain the desired pore-structure characteristics, the desired surface chemistry (functional groups), and good TC-sorption performance (high sorption capacity and rapid vacuum-regeneration). There is however a technical challenge associated with the above fabrication procedure, residing in the danger of polymer-monolith meltdown and shape distorsion during thermal treatment (carbonization). In particular, filaments used in 3D-printing are usually made of thermoplastic polymers, which tend to swell and melt during heating in a carbonization step.

To address the foregoing problem, carbon sorbent monoliths utilized in the trace contaminant removal processes have been produced by constraining the polymer monoliths by using structural supports to prevent the loss of shape of polymer monoliths during the fluid stage of carbonization (polymer melting), as described in U.S. patent application Ser. No. 16/920,538. In one embodiment of the method referred to in the foregoing application, the structural supports are comprised of vertically positioned stainless steel dowel pins and top, bottom, and side-support plates. In another embodiment, the structural supports are comprised of a side-support plate and pins extending from top and bottom support plates, in what could be termed a "bed-of-nails" assembly. While effective, the above-described means for preventing the loss of monolith shape entail the disadvantage of requiring redesign and re-fabrication of the monolith support structure each time the sorbent-monolith geometry is changed. The prior method described can also result in damaging parts of the monolith when the supporting structures are removed after carbonization.

To prevent swelling and melting during heating, and consequential loss of shape, it has now been found, in accordance with the present invention, that oxidizing polymer monoliths by exposure to air, at temperatures just below the polymer melting point, sets the monolith structure and substantially prevents swelling and melting during the carbonization step.

BRIEF SUMMARY OF THE INVENTION

It is the broad object of the present invention to provide a novel method for the fabrication of carbon sorbent monoliths produced from 3D-printed polymer monoliths, or from polymer monoliths produced using other methods, such as extrusion, injection molding, etc.

It is also an object of the invention to provide a novel sorbent monolith fabricated utilizing such a method.

It has now been found that certain of the foregoing and related objects of the invention are attained by the provision of a method for the production of a carbon sorbent monolith, for removing at least one gas from a gaseous environment in which the at least one gas is contained, comprising the steps:
producing a polymer monolith from a polymer precursor, using any suitable method;
pre-oxidizing the polymer monolith in a flow of an oxidizing gas at a temperature below the melting point of the polymer precursor;
carbonizing the pre-oxidized polymer monolith, so as to produce a carbon monolith, by exposure to elevated temperatures in a non-oxidative atmosphere, the pre-oxidizing step being carried out for a time sufficient to preserve the shape and features of the polymer monolith during the subsequent carbonizing step; and
optionally, activating the so-pre-oxidized, carbonized polymer monolith by exposure to an oxidizing environment under conditions sufficient to cause a carbon weight loss in said monolith of at least about 1 weight percent and thereby producing a microporous sorbent monolith with a surface area of at least about 100 $m^2/g$ and with the majority of pores being smaller than about 2 nanometers in size.

The method for producing the polymer monolith will desirably be selected from the group consisting of 3D-printing, extrusion, and injection molding, with 3D-printing usually being preferred. The polymer precursor employed will desirably be selected from the group consisting of polyether ether ketone (PEEK), polyetherimide (PEI), polycarbonate (PC), and mixtures thereof; preferably, it will comprise at least 70 weight percent of polyether ether ketone. The polymer precursor employed in the method will most desirably include 1 to 20 weight percent of fiber reinforcement, preferably comprised of carbon fibers, for improved shape retention during carbonization and enhanced strength.

The pre-oxidizing step of the method will usually be carried out in a flow of air at a temperature that is at least 1° C. below the melting point of the polymer precursor, and for at least three hours. The oxidizing environment in which activation may be effected will generally be selected from the group consisting of air, oxygen, carbon dioxide, steam, ozone, hydrogen peroxide, nitric acid, and mixtures thereof. Preferably, the oxidizing environment for activation will comprise air at a temperature in the range of 150° C. to 400°

C., and most desirably the temperature range will be 250° C. to 325° C. Weight loss in the monolith, caused by activation, will preferably be at least about 5 percent, and most desirably at least about 20 percent.

Other objects of the invention are attained by the provision of a carbon sorbent monolith produced by the method hereinabove and hereinafter described. The sorbent monolith will usually and desirably have a honeycomb cell structure, comprised of a multiplicity of contiguous, substantially identical, open-ended cells, or channels. Generally, the walls that define the cells will be about 0.10 mm to 1.0 mm thick.

DETAILED DESCRIPTION OF THE INVENTION

Figure 1:
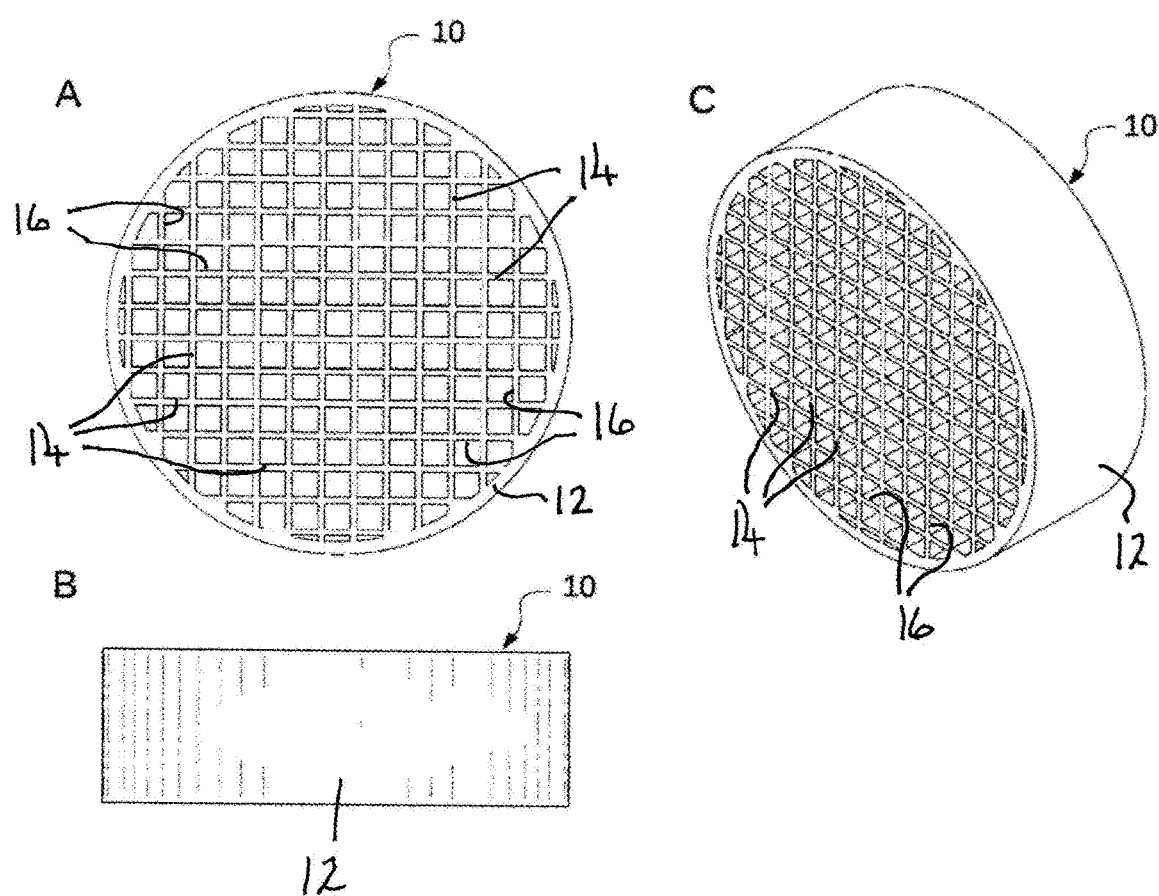
FIG. 1 comprises three views of a short, cylindrical monolith embodying the present invention, view A being a plan view, view B being a side elevational view, and view C being an isometric view.

Turning initially in detail to FIG. 1 of the drawings, therein illustrated is a short, cylindrical sorbent monolith, generally designated by the numeral 10, embodying the present invention. The monolith consists of a circumferential surrounding wall 12 and a grid of mutually perpendicular internal walls 14 defining a multiplicity of open-ended cells (channels) 16 extending axially through the monolithic body.

The fabrication method provided by the present invention comprises the following steps: (1) preparation of the precursor material (polymer) in a desired shape using 3D printing or any other suitable manufacturing method, such as injection molding or extrusion; (2) polymer-monolith pre-oxidation by exposure to air at a temperature below the polymer melting point for at least about 30 minutes, and preferably for three or more hours; (3) pre-oxidized polymer-monolith carbonization (pyrolysis) so as to provide a carbon monolith by exposure to elevated temperatures in a non-oxidative atmosphere; and ultimately (4) carbon-monolith activation to obtain the desired pore-structure characteristics, the desired surface chemistry (functional groups), and good TC-sorption performance (high sorption capacity and rapid vacuum-regeneration).

In the pre-oxidation step (2), the polymer monolith is exposed to an activating environment in a flow of air at a temperature that is at least 1° C., preferably at least 3° C., and most desirably at least 5° C. below the melting point, and for a period of at least 30 minutes, preferably at least one hour, and most desirably at least three hours. The pre-oxidation treatment sets the polymer structure, and at least substantially prevents monolith swelling and meltdown during subsequent thermal processing. The mechanism of this step is not presently understood, but it is quite possible that the presence of oxygen facilitates polymer cross-linking, which solidifies the monolith structure and makes it resistant to the loss of shape.

The activation step (4) can be implemented by means of contacting carbon with an oxidizing agent, such as air, oxygen, steam, or carbon dioxide. The activation process is usually associated with a carbon weight loss of normally at least 1.0 weight percent, preferably at least 5.0 weight percent, and most desirably 20 weight percent or more. Carbon activation creates additional internal surface area and porosity which, together with the oxygen species present on the carbon surface, are instrumental in the effective sorption of trace contaminants. The specific surface area of such carbon monoliths is normally higher than 100 $m^2/g$, preferably at least 300 $m^2/g$, and most desirably at least 500 $m^2/g$. In preferred embodiments, the majority of pores in the sorbent monolith will not exceed 2 nanometers in size.

EXAMPLE

Exemplary of the efficacy of the present invention is the following example. It employs, as the polymer precursor for monolith fabrication, polyether ether ketone reinforced with ~10 weight percent carbon fiber 3D printer filaments (i.e., PEEK/CF). The material was obtained from 3DXTECH Additive Manufacturing of Grand Rapids, Michigan.

3D Monolith Printing

An Intamsys Funmat HT 3D printer was used. The printer is designed specifically for higher melting temperature polymer materials, such as PEEK and PEEK reinforced with carbon fiber (PEEK/CF). The monolith produced and employed herein was 3D printed using the PEEK/CF filament. With reference to FIG. 1 of the drawings, the monolith had 0.5-mm square channels (open-ended cells), a diameter of 18 mm and a height (axial length) of 6 mm, the channel-defining walls being 0.25 mm thick and the circumferential wall being 0.5 mm thick.

Pre-Oxidation

Oxidative treatment of the monolith was effected at temperatures below the PEEK melting point (343° C.). This treatment was performed, prior to carbonization, in a flow of air at 340° C. for three to 20 hours. This step was found to successfully preserve the original PEEK/CF monolith shape during carbonization, without the need for supporting structures and thus greatly simplifying the fabrication process.

Various pre-oxidation conditions (temperature and time) were employed to determine the effects thereof on polymer-monolith shape retention. Pre-oxidation was carried out in a flow of air at atmospheric pressure. It was found that polymer monoliths pre-oxidized at 355° C. for 1 hour, i.e., above the PEEK melting point of 343° C., exhibited a severe loss of the original shape, with the honeycomb monolith channels being completely fused together and the monolith itself turning into a lump of melted polymer, which solidified upon cooldown. Subsequent carbonization in a flow of high-purity nitrogen at 800° C. produced even more severe loss of shape, due to material softening, melting, and swelling. The foregoing result is hardly unexpected since thermoplastic polymers are well known to go through a fluid stage and melting at temperatures close to and above their melting points. Naturally, whenever carbonization was attempted without the preceding pre-oxidation step monolith meltdown (i.e. the complete loss of shape) was always observed. Subjecting PEEK/CF honeycomb monoliths to pre-oxidation at temperatures lower than the PEEK melting point, e.g. at 340° C., for times longer than about 30 minutes, resulted in very good shape retention during pre-oxidation, and also during subsequent thermal processing, i.e. carbonization and activation. The resultant monoliths showed perfectly preserved channels as well as overall monolith shape, even though some shrinkage of the channel walls and the overall monoliths dimensions was observed. Shrinkage was on the order of 10 to 20 percent, was somewhat dependent on the thermal processing (heat-treatment) conditions, notably the time-temperature profile, and did not at all adversely affect the functional usefulness of the resultant monolithic TC sorbent.

Carbonization and Activation

A standard laboratory tube furnace was used for carbonization, and several heating profiles were utilized, some of them with a single heating rate of 5 K/min and others with hold times at about 500° C. The final carbonization temperature used was 800 to 900° C., and nitrogen was employed as a carrier gas. Carbon activation was carried out in a flow of air at 325° C. to a weight loss (burn-off) of ~20 weight percent using a tube furnace. It should be noted that, although generally advantageous, the activation step is optional, as carbons produced by polymer-precursor carbonization may already possess fair amounts of internal surface area and porosity.

Pore-Structure Characterization Methodology

An automated gas-sorption system ASiQwin (manufactured by Quantachrome Instruments of Ashland, Virginia) was used for collecting and processing nitrogen-isotherm data for carbon sorbents. Prior to making adsorption-isotherm measurements, each sample was outgassed under vacuum at 300° C. for at least three hours. Nitrogen-adsorption isotherms were determined at 77 K, and the resulting data were used to perform the following analyses: (a) Brunauer, Emmett, and Teller (BET) surface area; (b) pore volume; (c) Dubinin-Radushkevich (D-R) micropore surface area and micropore volume; and (d) pore-size distribution of micropores using the Density Functional Theory (DFT).

The BET surface area for sorbent monoliths derived from PEEK/CF was found to be about 585 $m^2/g$, and most of the pore volume (~70 percent) was found to consist of microporosity (pores smaller than 2 nm).

Sorbent Testing System and Procedure

Sorbent-monolith performance for ammonia, formaldehyde, and methyl mercaptan sorption and regeneration was tested, as described in a recent paper (Wójtowicz, M. A., Cosgrove, J. E., Serio, M. A., Carlson, A. E., Hostetler, J. M, Espinosa, N. and Chullen, C., "Pressure-Swing Adsorption of Trace Contaminants Using Carbon Sorbent Monoliths," paper ICES-2021-385, 50th International Conference on Environmental Systems, 2021). The tests performed demonstrated excellent monolith shape retention during sorbent-monolith fabrication, and also very good trace-contaminant removal performance. More than 2,000 adsorption-desorption cycles were carried out, with a half-cycle period of 5 minutes, for about 14 days of continuous pressure-swing adsorption operation at trace-contaminant levels close to their seven-day Spacecraft Maximum Allowable Concentrations (SMACs) Thus, TC-removal efficiencies were shown to be adequate for keeping ammonia and formaldehyde below SMAC levels at all times.

Figure 2:
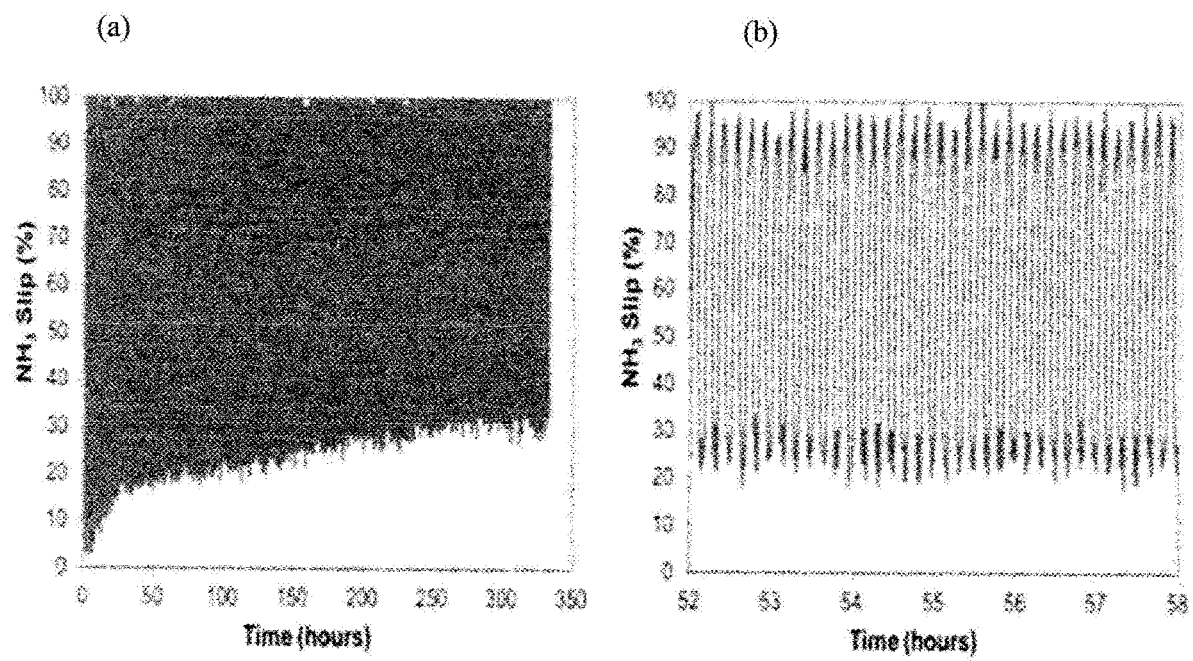
FIG. 2 comprises two plots, the plot of part (a) showing ammonia-sorption performance data obtained during a rapid adsorption-desorption cycling procedure, and the plot of part (b) showing a portion of the large data set constituting part (a), drawn to an enlarged scale.

Data illustrating the removal of ammonia, the most important trace contaminant of interest within the space-suit ventilation loop, are shown in FIG. 2. As previously indicated, part (a) of FIG. 2 is a plot of ammonia-sorption performance during a rapid adsorption-desorption cycling test with a half-cycle of 5 minutes. The sorbent employed in the test was derived from a 3D-printed PEEK/CF cylindrical monolith carbonized at 900° C. and activated in a flow of air at 325° C. to a burn-off of ~20 weight percent; it had 0.5-mm square channels with defining walls of ~0.25 mm in thickness, a diameter of ~17 mm, an axial length of ~3.5 mm, and a weight of 0.466 g. The gas flow rate through the sorbent was 0.52 L/min, and the ammonia inlet concentration was ~5.5 ppm. The sorbent was regenerated by exposure to vacuum created by a rotary-vane pump (~0.3 Torr). As indicated previously, FIG. 2 (b) reproduces a portion of the large data set shown in FIG. 2 (a).

Ammonia slip is defined as ammonia concentration at the sorbent outlet, expressed in terms of the percentage of the ammonia inlet concentration. Thus, the ammonia-removal efficiency is equal to 100 percent minus ammonia slip. The data in FIG. 2 show that the sorbent monolith performs well over about 330 hours (~14 days), i.e. 2,000 rapid adsorption-desorption cycles, at a residence time of 40 ms, which is relevant to full-scale operation of the Exploration Portable Life Support System (xPLSS) within the NASA space suit, using modest-quality vacuum for sorbent regeneration (0.3 Torr). Data in FIG. 2 also show that ammonia-removal efficiency (initially close to 100 percent) decreases gradually with time, to reach about 70 percent at the end of this long test. Sorbent-design calculations similar to those described by Paul et al. (Paul, H. L., Jennings, M. A., and Waguespack, G. M., "Requirements and sizing investigation for Constellation space suit Portable Life Support System Trace Contaminant Control," Proc. 40th Int. Conf. on Environmental Systems, AIAA, Barcelona, Spain, Paper No. AIAA 2010-6065, 2010) were carried out, and showed that an ammonia-removal efficiency of at least ~50 percent would be sufficient to make sure the astronaut breathes oxygen with ammonia under 7-day SMAC (2 $mg/m^3$) (Wójtowicz et al. 2021). Therefore, the 70 percent removal efficiency shown in FIG. 2 is more than sufficient to meet NASA requirements.

Prophetic Examples

Monoliths having the honeycomb structure illustrated in FIG. 1 and described above are fabricated using each of the polymer precursors: PEEK, PEI, PEI/CF, PC, and PC/CF, as defined herein. Each of the monoliths is oxidized under temperature and time conditions suitable for the particular polymer of fabrication, as will be evident to or readily determined by those of ordinary skill in the art, based upon the operative example hereinabove set forth and other teachings of the specification. The thus pre-oxidized monoliths are thereafter carbonized and activated, again under suitable temperature and time conditions which will be evident to those of ordinary skill in the art.

It is expected that shape-retention and other properties comparable to those of the PEEK/CF sorbent monoliths produced in accordance with the foregoing operative example would be exhibited by sorbent monoliths produced in accordance with the present prophetic examples.

Precursor Selection

The following criteria may be applied beneficially for polymer-precursor selection:
  compatibility with 3D printing (in the preferred embodiments);
  good shape retention upon carbonization and activation (a high carbon yield during carbonization, i.e. a low volatile-matter content, which is favorable for shape retention; furthermore, high carbon yields improve process economics);
  good TC sorption and sorbent regeneration demonstrated by the final product (sorbent monolith).

As will be appreciated by those skilled in the art, despite specific descriptions and disclosures provided herein many variations in the form, size, and shape of the sorbent monolith, and in the steps and conditions employed for producing it, may be made without departing from the effective scope of the appended claims.

The invention provides a novel method for improving shape-retention of polymer monoliths resulting from 3D printing or other suitable manufacturing techniques, during subsequent thermal processing steps of carbonization and activation. It also provides a novel carbon sorbent monolith produced by the method. Thus, the stated objects of the invention are attained by the instant method and product, as described in the foregoing specification and defined by the appended claims.

Having thus described the invention, what is claimed is:

1. A method for the production of a carbon sorbent monolith for removing at least one gas from a gaseous environment in which the at least one gas is contained, comprising the steps:
    (a) producing a shaped polymer monolith using 3-D printing of a polymer precursor consisting essentially of polyether ether ketone (PEEK);
    (b) pre-oxidizing said shaped polymer monolith in a flow of an oxidizing gas at a temperature below the melting point of said polymer precursor for a time sufficient to preserve the shape of said polymer monolith during a subsequent carbonizing step;
    (c) carbonizing said pre-oxidized shaped polymer monolith of step (b) so as to produce a carbon sorbent monolith by exposure to elevated temperatures in a non-oxidative atmosphere; and
    (d) optionally, activating said carbon sorbent monolith of step (c) by exposure to an oxidizing environment under conditions sufficient to cause a carbon weight loss in said carbon sorbent monolith of at least about 1 weight percent and thereby producing a microporous sorbent monolith with a surface area of at least about 100 $m^2/g$, with the majority of pores being smaller than about 2 nm.

2. The method of claim 1, wherein said pre-oxidizing step (b) is carried out at a temperature at least 3° C. below said melting point of said polymer precursor.

3. The method of claim 1, wherein said pre-oxidizing step (b) is carried out at a temperature at least 5° C. below said melting point of said polymer precursor.

4. The method of claim 1 wherein said sorbent monolith has a honeycomb cell structure.

5. The method of claim 4, wherein the walls that define the cells of said honeycomb structure are about 0.10 mm to 1.0 mm thick.

6. The method of claim 1, wherein said polymer precursor includes reinforcement in the form of fibers, at a fiber content of about 1-20 weight percent, for improved shape retention during said carbonizing step (c) and for enhanced strength.

7. The method of claim 6, wherein said fibers are carbon fibers.

8. The method of claim 1, wherein said pre-oxidizing step (b) is carried out in a flow of air.

9. The method of claim 1, wherein said pre-oxidizing step (b) is carried out at a temperature at least 1° C. below said melting point of said polymer precursor.

10. The method of claim 1, wherein said time in step (b) sufficient to preserve the shape of said polymer monolith during subsequent carbonizing step (c) is at least about 3 hours.

11. The method of claim 1, wherein said oxidizing environment in step (d) is selected from the group consisting of air, oxygen, carbon dioxide, steam, ozone, hydrogen peroxide, nitric acid, and mixtures thereof.

12. The method of claim 1, wherein said oxidizing environment in step (d) comprises air at a temperature in the range of 150° C. to 400° C.

13. The method of claim 12, wherein said temperature range in step (d) is 250° C. to 325° C.

14. The method of claim 1, wherein said carbon weight loss of at least about 1 weight percent in said step (d) is at least about 5 weight percent.

15. The method of claim 1, wherein said carbon weight loss of at least about 1 weight percent in said step (d) is at least about 20 weight percent.

* * * * *